(12) United States Patent
O'Keeffe et al.

(10) Patent No.: US 8,548,457 B2
(45) Date of Patent: Oct. 1, 2013

(54) PROVIDING FLEXIBLE RF CHANNEL TO PORT MAPPINGS

(75) Inventors: Frank O'Keeffe, Glounthaune (IE); Gerald Ryan, Geneva, IL (US); Ubaldo Cepeda, Oswego, IL (US); Thomas Cloonan, Lisle, IL (US)

(73) Assignee: Arris Enterprises, Inc., Suwanee, GA (US)

( * ) Notice: Subject to any disclaimer, the term of this patent is extended or adjusted under 35 U.S.C. 154(b) by 588 days.

(21) Appl. No.: 12/794,819

(22) Filed: Jun. 7, 2010

(65) Prior Publication Data
US 2010/0317387 A1    Dec. 16, 2010

Related U.S. Application Data

(60) Provisional application No. 61/185,742, filed on Jun. 10, 2009.

(51) Int. Cl.
*H04W 24/00*   (2009.01)

(52) U.S. Cl.
USPC .......... 455/423; 455/507; 455/450; 455/422.1

(58) Field of Classification Search
USPC .............. 455/507, 452.1, 509, 74, 88, 562.1, 455/66.1, 108, 118, 121, 124, 129, 277.1, 455/275, 276.1, 450, 422.1, 414.2, 423, 41.2; 348/180; 370/503, 521, 328
See application file for complete search history.

(56) References Cited

U.S. PATENT DOCUMENTS

| | | | |
|---|---|---|---|
| 2005/0053008 A1* | 3/2005 | Griesing et al. | 370/241 |
| 2010/0064074 A1* | 3/2010 | Hansquine et al. | 710/61 |
| 2012/0218419 A1* | 8/2012 | Massey | 348/180 |

* cited by examiner

Primary Examiner — John J Lee
(74) Attorney, Agent, or Firm — Troy A. Van Aacken

(57) ABSTRACT

Methods, systems, and apparatus can be used to flexibly allocate RF channels to output ports on edge termination systems. Flexible edge termination systems can include multiplexing modules operable to combine signals together inside of the flexible edge termination system to provide a flexible mapping of RF channels to output ports.

18 Claims, 6 Drawing Sheets

US 8,548,457 B2

PROVIDING FLEXIBLE RF CHANNEL TO PORT MAPPINGS

RELATED APPLICATIONS

This application claims priority as a non-provisional utility of U.S. Provisional Patent Application Ser. No. 61/185,742, entitled "Providing Flexible RF Channel to Port Mappings," filed Jun. 10, 2009, which is incorporated herein by reference in its entirety.

TECHNICAL FIELD

This disclosure relates to edge termination systems.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

Based upon increased demand for many of these services, MSOs often find themselves reconfiguring their headend equipment (e.g., edge termination system) to provide a higher number of channels per service group. Each channel can provide a level of service to the service group. Each of the edge termination devices can include an upconverter that was dynamically tunable to an output frequency, and would be connected to a combiner to multiplex signals together. When an existing deployment outgrows the currently configured service level, technicians are sent to the headend to re-cable the deployment to provide additional radio frequency (RF) channels to the service group. However, re-cabling the deployment leads to service outages, additional cable, equipment, technician time, expense, etc.

SUMMARY

Systems and methods of this disclosure can operate to discard packets responsive a time-based metric associated with a packet queue. Example systems can include an input module, a radio frequency conversion module, and a switching module. The input module can receive incoming baseband signals, while the radio frequency conversion module can operate to convert the incoming baseband signals to radio frequency channels. The switching module can then apply any of the plurality of radio frequency channels to any of a plurality of output ports, wherein each of the output ports transmit the applied radio frequency channels to a respective service group.

Example methods for providing flexible RF to port mapping can include the steps of: receiving a plurality of incoming baseband signals at an edge termination device; converting the plurality of incoming baseband signals to a plurality of radio frequency channels using a plurality of modulators; selecting a subset of the plurality of radio frequency channels and an output port based upon edge termination device settings provided by an administrator; coupling the selected subset of radio frequency channels to the selected output port.

Other example systems can include: an input module, a stream processor and a switching module. The input module can receive a plurality of incoming baseband signals. The stream processor can modulate the plurality of baseband signals to a plurality of radio frequency channels. The switching module can receive input from an administrator identifying a subset of radio frequency channels from the plurality of radio frequency channels and a selected output port. The switching module can also operable to couple the subset of radio frequency channels to the selected output port, wherein the output port is operable to transmit the selected subset of radio frequency channels to a respective service group.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations of this disclosure, systems and methods can operate to provide flexible RF channel to port mappings on an edge termination system. For example, if a service group has outgrown a bandwidth associated with its assigned RF channels another RF channel can be added to the port within the edge termination system without re-cabling the system. Systems and methods of this disclosure can include a combiner (e.g., mixer) inside the edge termination system before outputting the signal to an output port (e.g., an RF connector). Switching inside the edge termination system can thereby provide a flexible mapping of RF channels to the output ports without requiring re-cabling of the system. In some implementations, the control of the system can be provided remotely. Remote control of the RF channel to port mapping can facilitate adjustment of a number of channels being provided to a service group, for example, from a central location, without requiring that a service technician visit the deployment site (e.g., a headend).

Figure 1:
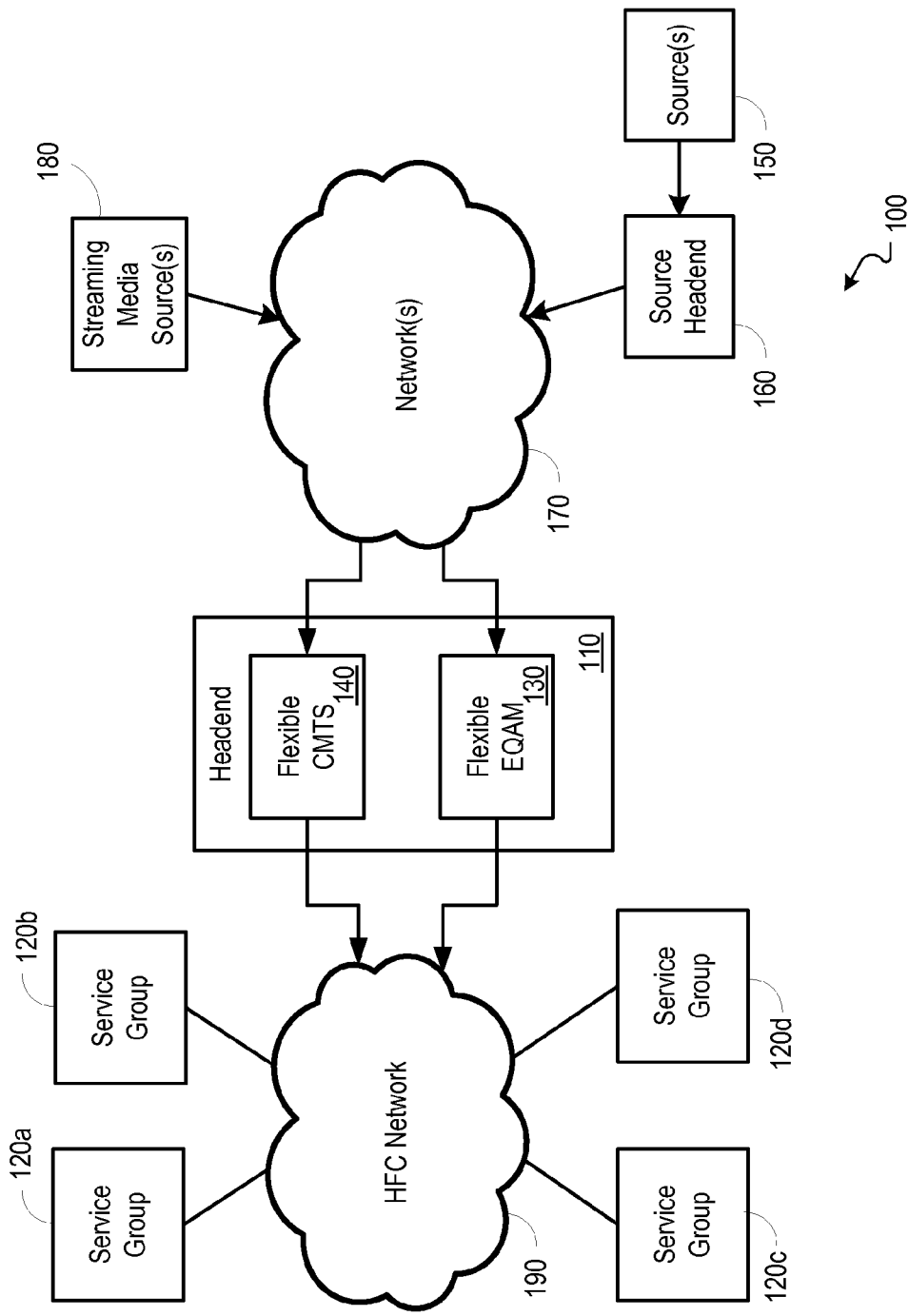
FIG. 1 is a block diagram illustrating an example network environment operable to include an edge termination device with a flexible channel to port mapping.

FIG. 1 is a block diagram illustrating an example network environment 100 operable to include an edge termination device with a flexible channel to port mapping. In some implementations, a headend 110 can provide video, data and/or voice service(s) to a subscriber group (e.g., service group(s) 120*a*-*d*). The headend 110 can include devices such as an edge quadrature amplitude modulation (EQAM) device 130 and a cable modem termination system (CMTS) 140. Video streams can be received from a video source (or sources) 150 through a source headend 160 via a network(s) 170 (e.g., including the internet or one or more external networks). In some implementations, these video streams can enter the system as raw moving picture experts group (MPEG) streams, or any other streaming video protocol supported by the headend 110 and/or EQAM device 130.

Data services can be handled by the headend 110 through a CMTS 140. The CMTS 140 can receive data signals from user device(s) in the service group(s) 120*a-d* and server(s) 180 through network(s) 170 (e.g., including the Internet). The network(s) 170, for example, can operate using Internet protocol (IP), sending data packets to and receiving data packets from the headend 110. In some examples, the CMTS 140 can be paired with a SIP proxy server (not shown) operable to provide voice over internet protocol (VoIP) services with connectivity to the public switched telephone network (PSTN). In still further examples, one or more video sources 150 may provide streaming data through the network(s) 170 to the CMTS 140

In some implementations, the CMTS 140 can forward received packets to the EQAM device 110 used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more service groups 120*a-d* via a hybrid fiber-coax (HFC) network 190. In other implementations, the CMTS 140 can modulate a baseband signal to a carrier wave and transmit the signal to a combiner for upconversion to a transmission frequency.

Edge termination devices (e.g., including CMTS, EQAM systems, wireless access points, and wireless base stations, among others) can include a combiner operable to multiplex multiple baseband signals into multiple RF channels for output to one or more ports. The edge termination devices can further include a switching module operable to provide switching to configure which RF channels are connected to each output port. In some implementations, the switching module can configure a number of RF channels connected to each output port. Thus, for example, where a particular service group consumes a large amount of bandwidth, the switching module can connect more RF channels to that service group. In another example, where a particular service group does not consume a large amount of bandwidth, the switching module might provide no more than the number of channels indicated by the bandwidth consumption.

Figure 2:
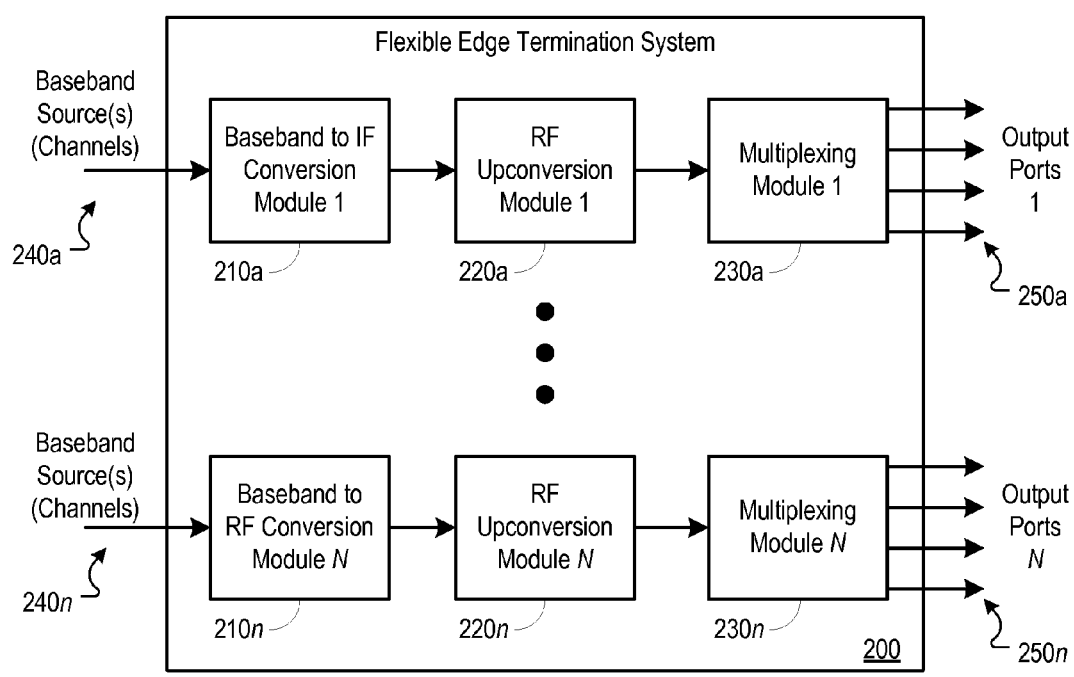
FIG. 2 is a block diagram illustrating an example flexible edge termination system having flexible channel to port mapping.

FIG. 2 is a block diagram of an example flexible edge termination system 200 using a flexible RF channel to port mapping. The flexible edge termination system 200 can include N number of baseband to intermediate frequency (IF) conversion modules 210*a-n*, RF upconversion modules 220*a-n*, and multiplexing modules 230*a-n*. Each of the N number of modules 210-230*a-n* being operable to receive some number of baseband source signals 240*a-n*. In some implementations, there may be some upstream filtering providing a different set of baseband source signals 240*a* to baseband conversion module 1 240*a*, than the set of baseband source signals 240*n* supplied to baseband conversion module N 240*n*.

A baseband to IF conversion module 210*a-n* can receive the one or more digital baseband signals (e.g., via etherlink) in packetized form. The baseband to IF conversion module 210*a-n* can process the stream (e.g., based upon the type of stream) and convert the baseband signal to an IF signal. In some implementations, the baseband to IF conversion module 210*a-n* can convert the baseband signal into an IF signal to perform further processing on the signal. The IF signal can comprise a channel that corresponds to the digital baseband signal. The channel can be of a specified bandwidth, e.g., based upon a DOCSIS standard.

The RF upconversion module 220*a-n* can upconvert the IF signals to generate an RF signal. The generated RF signal can be operable to be transmitted on a hybrid fiber coax network. In some implementations, the RF upconversion module 220*a-n* can upconvert the IF signal to a center frequency for the associated channel slot. In some examples, the slot can be specified by the MSO based upon a channel plan.

A multiplexing module 230*a-n* can multiplex various of the RF signals together. For example, if a service group consumes broadband services that correspond to 4 channels, the multiplexing module 230*a-n* can multiplex four 6 MHz channels together. In some implementations, where the RF upconversion module has not slotted the IF signals to the correct center frequency, the multiplexing module 230*a-n* can slot the RF channels before combining the channels, such that the signals do not significantly interfere with each other. The multiplexing module 230*a* can output the RF signals to a first set of output ports 250*a*, while multiplexing module 230*n* can output the RF signals to the nth set of output ports 250*n*. In various implementations, a multiplexing module 230*a* can output any number of the RF channels associated with the incoming baseband signals to any of the first set of output ports 250*a*. Thus, for example, if there were 64 incoming baseband signals, the corresponding RF channels could all be connected to a first port selected from the first set of output ports 250*a*. Alternatively, the corresponding RF channels could be evenly split between the ports in the first set of output ports, or any other configuration the MSO would like to apply to the output ports. Such configuration can reduce the operating expenditure associated with recabling a deployment in response to increased bandwidth demand brought on by increased use of broadband services.

In various implementations, each of the baseband to IF conversion module 210*a-n*, RF upconversion module 220*a-n*, and the multiplexing module 220*a-n* can include multiple associated components corresponding to each of the incoming baseband source signals. Thus, for example, if there were eight incoming baseband source signals there can be eight broadband to IF conversion elements contained within the broadband to IF conversion module 210*a*, eight RF upconversion modules. In some implementations, the number of multiplexing elements included within each multiplexing module 230*a-n* can correspond to the number of output ports controlled by the associated RF chain.

Figure 3:
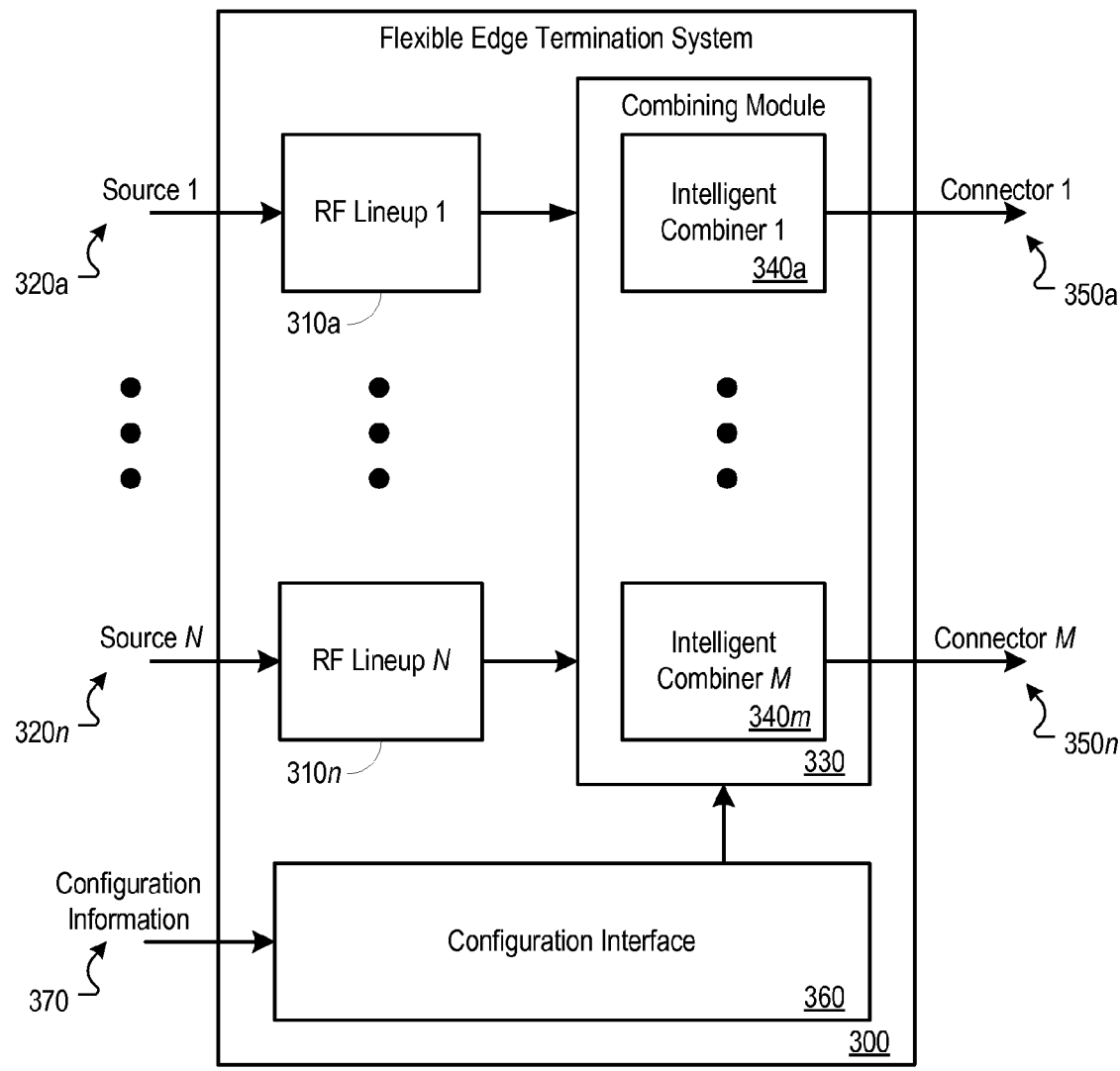
FIG. 3 is a block diagram illustrating another example flexible edge termination system.

FIG. 3 is a block diagram illustrating another example flexible edge termination system 300. The flexible edge termination system 300 can include N number of RF lineup chains 310*a-n* (e.g., including modulator, upconverter, amplifier, etc.) for each incoming baseband source 320*a-n*. The RF lineup chains 310*a-n* can convert operate to process and convert the incoming baseband signal to an RF signal suitable for transmission on an HFC network. The output of each of the RF lineup chains 310*a-n* can be fed into a combining module 330.

The combining module 330 can operate to provide each of the incoming RF lineup 310*a-n* outputs to each of M number of intelligent combiners 340*a-m*. The combining module 330 can therefore include splitters operable to split each of the RF signals into M number of similar RF signals. The intelligent combiners 340*a-m* can operate to dynamically select which of the RF lineup signals are connected to an associated connector 350*a-m*. Thus, for example, intelligent combiner 1 340*a* is responsible for selecting the RF signals to be output on connector 1 350*a*, while intelligent combiner m 340*m* is responsible for selecting the RF signals to be output on connector m 350m. In some implementations, logic or programming within the combining module 330 can operate to prevent the same signal from being output to multiple connectors.

The flexible edge termination system 300 can also include a configuration interface 360. The configuration interface 360 can facilitate configuration of the combining module 330 to determine which signals are output to the connector by each of the intelligent combiners 350a-m. In some implementations, the combiners can dynamically multiplex the signals to select how many channels are assigned to each of the connectors 350a-m. Thus, for example, if it is determined that the service group served by connector 1 350a, which previously used four channels, is now consuming enough bandwidth to justify six channels, the configuration interface can be used to reconfigure connector 1 350a to transmit 6 channels to the associated service group.

In some implementations, the configuration interface can include threshold data rates identifying thresholds at which more or less channels can be assigned to a service group. Thus, for example, the flexible edge termination system 300 can automatically reallocate bandwidth based upon changing needs. In other implementations, the configuration interface can include a network interface whereby a service operator for the MSO, for example, can reallocate channels supplied to any of the connectors 350a-m. In still further implementations, the configuration interface can include a manual configuration interface (e.g., a digital interface), whereby a user at the edge termination system can reconfigure the output ports to assign more or fewer channels to a connector 350a-m. It should be noted that each of the above recited implementations can be used alone or in any combination thereof, thereby facilitating configuration of the edge termination system 300 through any of a variety of mechanisms.

Figure 4:
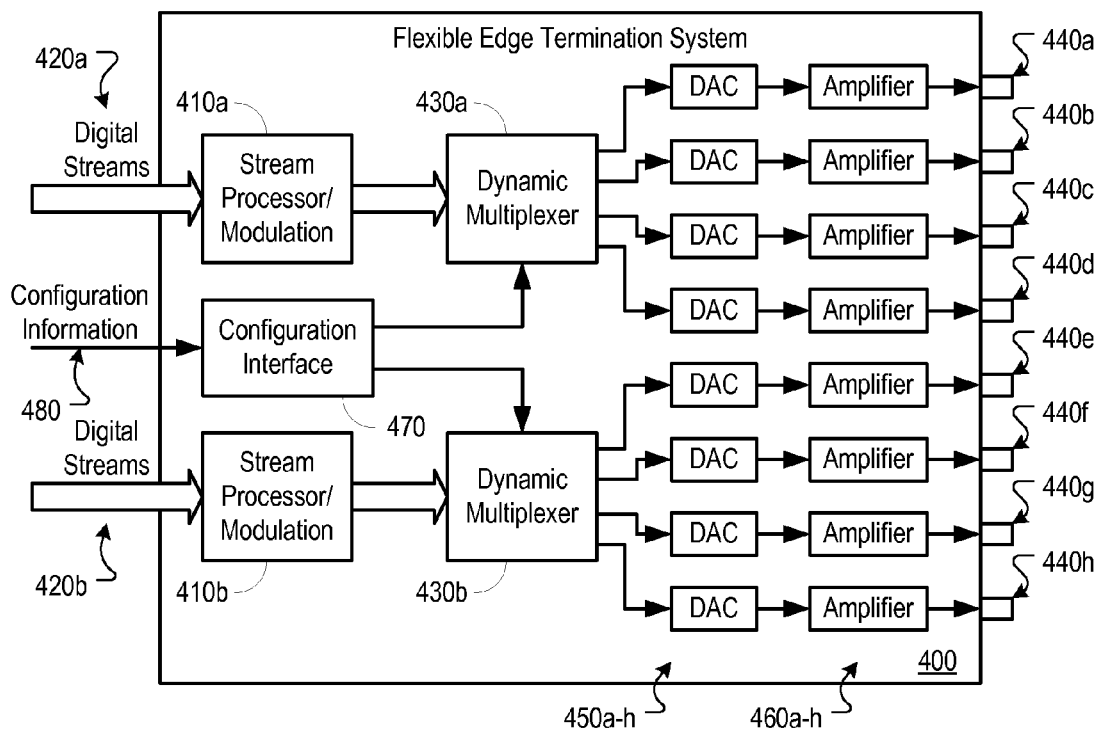
FIG. 4 is a block diagram illustrating another example flexible edge termination system.

FIG. 4 is a block diagram illustrating another example flexible edge termination system 400. The flexible edge termination system 400 can include multiple stream processor/modulation modules 410a-b that can be operable to receive multiple incoming streams 420a-b from a variety of streaming sources. The incoming streams 420a-b can be received, for example, via a 10 gigabit etherlink connection, and can be packetized. In some implementations, some types of streams can be subject to additional processing by the stream processor/modulation modules 410a-b. For example, video signals may be processed to convert the signal into a different format for transmission to users.

The flexible edge termination system 400 can also include dynamic multiplexer modules 430a-b. The dynamic multiplexer modules 430a-b can be operable to dynamically switch a digital RF signal generated by the stream processing/modulation modules 410a-b, respectively, to connect any of the RF signals generated by an associated stream processor/modulation module 410a-b to any of the output ports represented by connectors 440a-h. Thus, a dynamic multiplexer module 430a can connect any of the digital streams 420a to any of connectors 440a-d. For example, if there were 64 incoming digital streams, the dynamic multiplexer 430a can connect the digital RF signals associated with those streams (e.g., as generated by the stream processor/modulation module 410a) to any single connector 440a-d, thereby providing up to 64 channels to any one service group served by one of the connectors 440a-d. Alternatively, the dynamic multiplexer 430a can connect 32 channels to two connectors 440a-b and no channels to the other two connectors 440c-d. Any other configuration splitting the 64 channels between the connectors 440a-d can also be provided.

In some implementations, the flexible edge termination system 400 can also include digital to analog converters (DACs) 450a-h for each of the output ports 440a-h. The DACs 450a-h can receive the digital RF signal and convert the digital signal to an analog signal operable to be transmitted over an HFC network. The flexible edge termination system 400 can also include amplifiers 460a-h for each of the output ports 440a-h. The amplifiers 460a-h can amplify the signal to a transmission power, compensating for any loss in the processing components of the flexible edge termination system The flexible edge termination system 400 can also include a configuration interface 470. The configuration interface 470 can be used to specify the configuration of the dynamic multiplexer modules 430a-b. In some implementations, the configuration interface 470 can receive configuration information 480 from an administrator (e.g., an MSO associated with the flexible edge termination system 400). In some implementations, the configuration information 480 can be sent over a network to the configuration interface 470 from a remote management application. In other implementations, the configuration information 480 can be provided to the configuration interface through a user interface (e.g., a manual switchboard, a graphical user interface with a keypad or touchscreen interface, etc.).

In some implementations, the configuration interface 470 might not receive external configuration information 480. Instead, the configuration interface might be equipped to identify bandwidth use by each of the service groups and dynamically reallocate channels among the service groups serviced by the connectors 440a-h. In such implementations, the configuration interface may determine a percentage of bandwidth being consumed by each of the service groups and reallocate any service groups that have exceeded a threshold percentage of the allocated bandwidth by removing channels associated with service groups that are below the allocated bandwidth. In some such implementations, an MSO can attempt to connect service groups with different traffic usage patterns to the same flexible edge termination system. In additional implementations, the configuration interface can be configured to send an event (e.g., an alert) to an administrator (e.g., the MSO) when the bandwidth consumed by a service group exceeds a predetermined threshold or exceeds the bandwidth supplied by the channels allocated to the service group.

Figure 5:
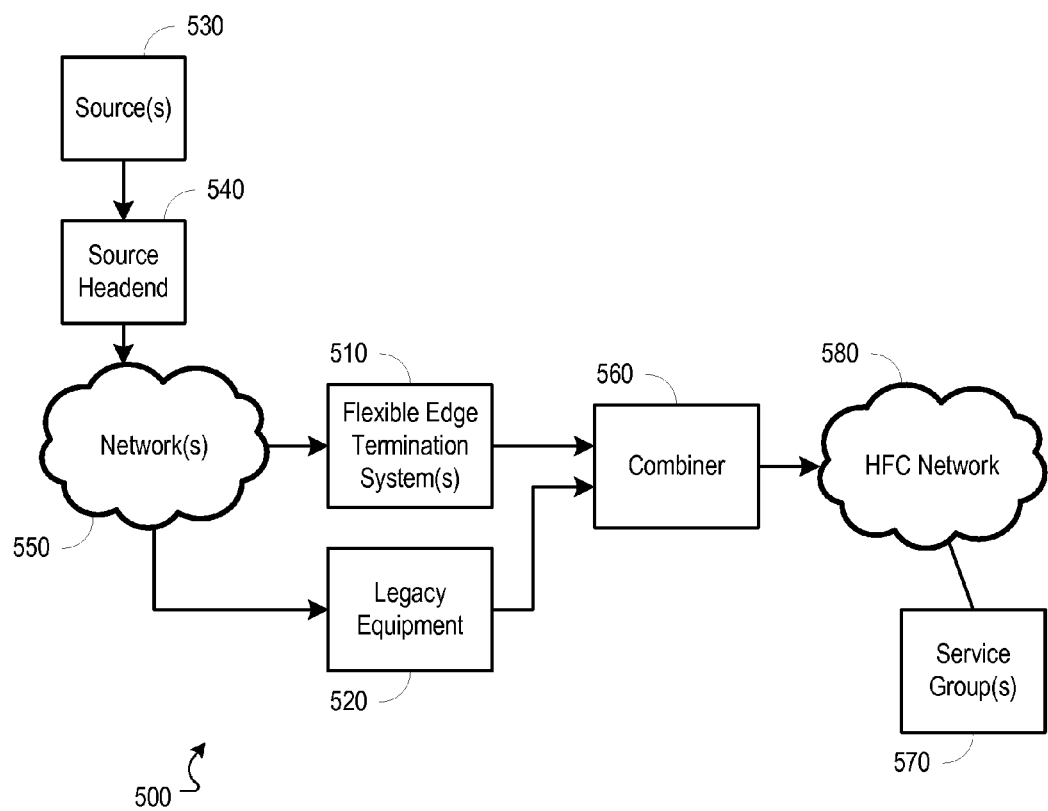
FIG. 5 is a block diagram illustrating a network environment including both flexible edge termination system and legacy equipment.

FIG. 5 is a block diagram illustrating a network environment 500 including both a flexible edge termination system 510 and legacy equipment 520 (e.g., including legacy edge termination systems, analog equipment, etc.). Both the flexible edge termination system 510 and the legacy edge termination equipment can receive streaming signals from a source 530. In some implementations, the streaming signals can be received from the source via a source headend 540 and a network 550. The source headend 540 can aggregate signals received from a variety of sources 530 and provide those aggregated signals to an edge termination system (e.g., a flexible edge termination system 510 or legacy equipment 520) through one or more networks 550.

The flexible edge termination system(s) 510 can combine channels for service groups. However, the legacy equipment may not be able to provide multiple channels on a single output, may exist entirely in an analog domain, and/or may also need to be combined and slotted by a combiner 560. Thus, the output of the flexible edge termination system(s) 510 can be fed into the combiner 560 with the legacy equipment 520 signals to be combined into a signal for transmission to one or more service groups 570—served by the combiner 560, through an HFC network 580.

Figure 6:
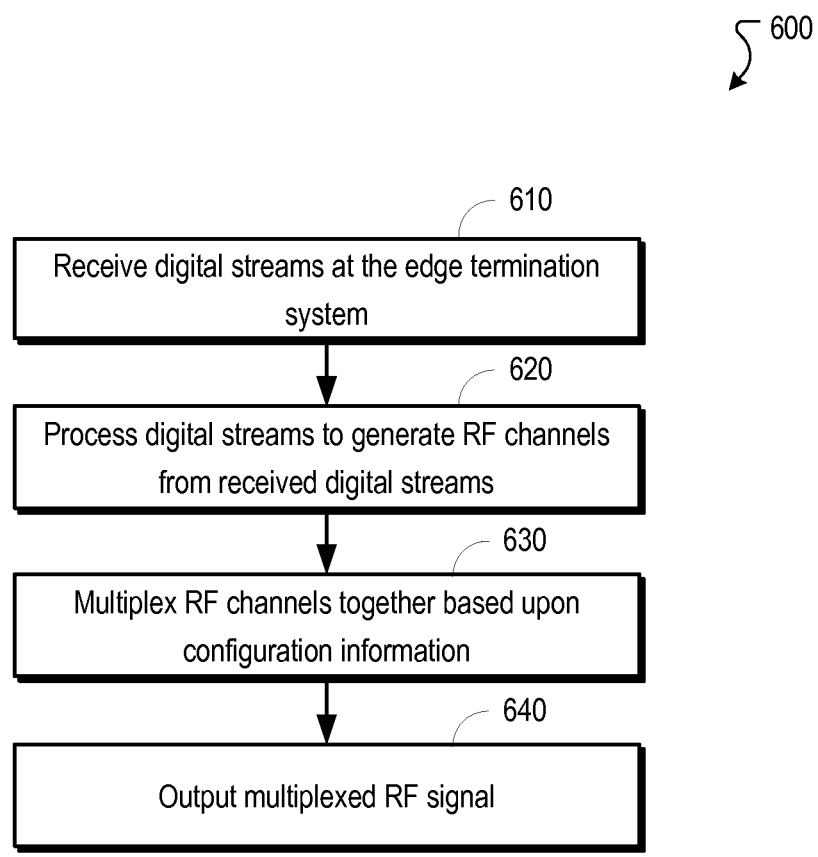
FIG. 6 is a flowchart illustrating an example process for providing flexible RF channel to port mapping on edge termination systems.

FIG. 6 is a flowchart illustrating an example process 600 for providing a flexible RF channel to port mapping on edge termination systems. At stage 610, digital streams are received at the edge termination system. The digital streams can be received, for example, from a stream source (e.g., a television network, internet server, etc.) through a source headend and/or one or more networks. For example, a source headend can receive a streaming feeds from NBC, ABC, ESPN, CBS, etc. The headend source can repackage the streams into one or more multi-program transport streams (MPTS) and transmit the one or more MPTSs to the edge termination system.

At stage 620, the digital transport streams can be processed to generate RF channels from the received signals. The digital transport streams can be processed, for example, by an RF lineup (e.g., RF lineup 310a-n of FIG. 3) or a modulation module (e.g., stream processor/modulation module 410a-b of FIG. 4). In some implementations, each modulation module can receive a predetermined number of digital transport streams to be processed. For example, each modulation module may be responsible for 48 transport streams.

At stage 630, the RF channels can be multiplexed together based upon configuration information. The RF channels can be multiplexed, for example, by one or more multiplexing modules (e.g., intelligent combiner 340a-m of FIG. 3, or dynamic multiplexer 430a-b of FIG. 4). In some implementations, the configuration information can be provided by a system administrator (e.g., an administrator with an MSO associated with the edge termination system). In other implementations, the configuration information can be provide by intelligent logic residing on the edge termination system, which attempts to balance the load when the use of the channels by one service group is much higher than the use of the other channels assigned to the other service groups. In still further implementations, the configuration information can be provided through an onboard interface (e.g., manual, graphical user interface, touch screen, etc.) to the edge termination system.

At stage 640, the multiplexed RF signal can be output. The multiplexed RF signal can be output, for example, by one or more multiplexing modules operating in conjunction with one or more connectors (e.g., connectors 350a-n of FIG. 3, or connectors 440a-h of FIG. 4). In some configurations, multiple channels might be provided on a particular output connector. In other configurations, no channels might be provided on a particular output connector.

The edge termination system (e.g., CMTA, EQAM, wireless access point, wireless base station, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. An edge termination system, comprising:
   an input module operable to receive a plurality of incoming baseband signals;
   a radio frequency conversion module operable to convert the plurality of incoming baseband signals to a plurality of radio frequency channels;
   a switching module operable to apply any of the plurality of radio frequency channels to any of a plurality of output ports; and
   wherein each of the output ports transmit the applied radio frequency channels to a respective service group.

2. The edge termination system of claim 1, wherein the radio frequency conversion module comprises a baseband to intermediate frequency modulator operable to receive a baseband signal and to modulate the baseband signal to an intermediate frequency signal and a radio frequency upconversion modulator operable to modulate the intermediate frequency signal to a radio frequency channel.

3. The edge termination system of claim 1, wherein the switching module comprises a multiplexer module operable to control which of the radio frequency channels are coupled to a particular output port.

4. The edge termination system of claim 1, wherein the switching module is operable to be controlled dynamically without requiring rearrangement of cabling to the output ports.

5. The edge termination system of claim 1, wherein the switching module comprises a combining module operable to intelligently combine the radio frequency channels for coupling to the output ports.

6. The edge termination system of claim 5, wherein the radio frequency conversion module comprises a stream processor and the switching module comprises a dynamic multiplexer operable to receive configuration information through a configuration interface and dynamically multiplex the radio frequency channels and couple a plurality of output signals to any of the plurality of output ports.

7. The edge termination system of claim 6, further comprising a plurality of digital to analog converters operable to convert the outputs from the dynamic multiplexer to analog signals coupled to the respective output ports.

8. The edge termination system of claim 7, further comprising a plurality of amplifiers operable to amplify the analog signals to transmission level prior to transmitting the signals on the respective output ports.

9. An edge termination system, comprising:
   an input module operable to receive a plurality of incoming baseband signals;
   a stream processor operable to modulate the plurality of baseband signals to a plurality of radio frequency channels;
   a switching module operable to receive input from an administrator identifying a subset of radio frequency channels from the plurality of radio frequency channels and a selected output port, the switching module being operable to couple the subset of radio frequency channels to the selected output port; and
   wherein the output port is operable to transmit the selected subset of radio frequency channels to a respective service group.

10. The edge termination system of claim 9, wherein the output port is coupled to a hybrid fiber-coax network.

11. A method, comprising:
    receiving a plurality of incoming baseband signals at an edge termination device;
    converting the plurality of incoming baseband signals to a plurality of radio frequency channels using a plurality of modulators;
    selecting a subset of the plurality of radio frequency channels and an output port based upon edge termination device settings provided by an administrator;
    coupling the selected subset of radio frequency channels to the selected output port.

12. The method of claim 11, wherein converting the plurality of incoming baseband signals to a plurality of radio frequency channels, comprises:
    modulating the received a baseband signals to an intermediate frequency; and upconverting the intermediate frequency signals to a plurality of radio frequency channels.

13. The method of claim 11, further comprising using a multiplexer to control the coupling of the selected subset of radio frequency channels are coupled to the selected output port.

14. The method of claim 11, further comprising dynamically controlling the multiplexer without requiring rearrangement of cabling to the output ports of the edge termination device.

15. The method of claim 11, further comprising using a combiner to intelligently combine the selected subset of radio frequency channels for coupling to the selected output port.

16. The method of claim 15, further comprising:
   receiving configuration information through a configuration interface; and
   dynamically multiplexing the radio frequency channels to the output ports.

17. The method of claim 16, further comprising converting the outputs from the dynamically multiplexed radio frequency channels from digital to analog signals using a digital to analog converter.

18. The method of claim 17, further comprising:
   amplifying the analog signals to transmission level prior; and
   transmitting the signals on the respective output ports.

\* \* \* \* \*